United States Patent [19]

Wallace et al.

[11] 3,860,796

[45] Jan. 14, 1975

[54] MAGNETICALLY SENSIBLE RECORD AND PROCESS OF PRODUCING SAME

[75] Inventors: John G. Wallace, Ashland; Paul H. Kuzia, Westwood, both of Mass.

[73] Assignee: Synergistics, Inc., East Natick, Mass.

[22] Filed: Dec. 9, 1969

[21] Appl. No.: 883,537

Related U.S. Application Data

[63] Continuation-in-part of Ser. No. 855,501, Sept. 5, 1969.

[52] U.S. Cl. ......... 235/61.12 M, 340/149 A, 360/2, 101/150

[51] Int. Cl. .. G11b 25/04, G06k 7/08, G06k 19/02, G06k 19/06, B41f 3/36

[58] Field of Search .. 340/149 A; 235/61.12, 61.11, 235/61.11 D, 61.1; 101/93 RC; 346/74 MP; 101/150

[56] References Cited

UNITED STATES PATENTS

| | | | |
|---|---|---|---|
| 2,508,953 | 5/1950 | Knutsen | 235/61.12 |
| 2,520,077 | 8/1950 | Wolowitz | 101/369 |
| 2,961,649 | 11/1960 | Eldredge | 346/74 MP |
| 3,015,087 | 12/1961 | O'Gorman | 340/149 |
| 3,325,632 | 6/1967 | Lilly | 235/61.12 |
| 3,445,633 | 5/1969 | Ratner | 235/61.7 |
| 3,502,851 | 3/1970 | Kakimoto | 235/61.12 |
| 3,531,627 | 9/1970 | Ham | 235/61.12 M |

*Primary Examiner*—Daryl W. Cook
*Assistant Examiner*—Robert M. Kilgore
*Attorney, Agent, or Firm*—Lee A. Strimbeck

[57] ABSTRACT

A magnetically sensible record of data is prepared by indenting or embossing the surface of a non-magnetic receptor sheet, such as a plastic or cardboard card, with a linear series of indentations arranged in a binary code form. In one embodiment, the indentations are filled, as by squeegeeing with finely divided particles of a magnetically sensible material such as magnetic iron oxide and a binder therefor, and fixing the particles in the indentations as by drying or setting the binder when one is used or by overcoating with a plastic film. In another embodiment the card is first coated with the ferrite material so that the indentations are filled at the moment of impact, after which excess ferrite material is removed from the background areas as by wiping.

The data record per se is also claimed. It is characterized by the absence of magnetic material between the individual bits of data, such that the card, when read, gives a high signal to noise ratio.

3 Claims, 4 Drawing Figures

INVENTORS
JOHN G. WALLACE
PAUL H. KUZIA
BY
Burgess, Dinklage + Sprung
ATTORNEYS.

MAGNETICALLY SENSIBLE RECORD AND PROCESS OF PRODUCING SAME

RELATED APPLICATIONS

This application is a continuation-in-part of Ser. No. 855,501, filed Sept. 5, 1969, and having the same title.

Application Ser. No. 864,846, "High Speed Indenting Recorder," filed Oct. 8, 1969, by one of the present inventors, John G. Wallace, and another, describes one type of indenting head that can be used in the practice of this invention.

PRIOR ART

U.S. Pat. No. 3,325,632 (Lilly) discloses a method of permanently storing and reproducing data by indenting or perforating a thin magnetic layer or coating carried on a suitable nonmagnetic support with a series of indentations in a binary code form. The distortions so produced in the coating can be read by a suitable reading head responsive to the fringe flux about the indentations.

The procedure works well in many applications, but does require that a special, and thus relatively expensive, recording member with a suitable magnetic coating be used. In addition, the signal to noise ratio may be quite low because of the presence of the magnetic coating in the non-indented areas of the record.

U.S. Pat. No. Re. 23,385 (Knutsen) discloses a record having perforations filled with a variety of materials sensible by one means or another, but the perforations are not capable of being arranged as bits in high density alpha-numeric binary code form.

THIS INVENTION

According to the present invention, a suitable base sheet such as card stock or a plastic is indented with a series of indentations with a suitable stylus such as one operated by a solenoid and designed to imprint the sheet as the sheet moves thereunder. The indentations are in a binary code form and their density can be 50 to 500 bits per inch or higher. The indentations are filled with a fluid ink or paste, or a dry powder containing particles of a magnetically sensible material such as a magnetic iron oxide, mumetal or carbonyl iron. This can be done by precoating the card in the area to be indented with a ferrite paste or ink, or by squeegeeing, wiping or doctoring the paste or powder over the surface of the base sheet following the indenting step. The paste, if one is used, is then allowed to cure. If dry powder is used, the indentations are subsequently overcoated as with a lacquer to secure the powder in place.

Since the magnetically sensible material is just level with or below the surface of the sheet, it is protected from physical abuse. This record is eminently suitable for use as a pocket credit card. The filled indentations may, of course, be further protected by an overlay, for example, of a plastic lacquer or by bonding a plastic film thereover. When the ferrite material is impacted into the indentation into a plastic card, the "spring-back" properties of the plastic cause the walls of the indentations to physically firmly hold the ferrite material in place.

The magnetic record is non-alterable and non-erasable, and is not subject to magnetic distortion or cancellation, especially if it is read with a reluctance type playback head. The record gives an excellent high signal to noise ratio because of the lack of magnetic material between recorded data bits.

The record can have on its face conventional man-readable information, so that the record can be stored, retrieved, and read either manually or by machine.

The record can be in the form of a tape with only one or two lines of recorded information thereon, or can be in the form of a sheet with a plurality of spaced lines thereon. The indentations made by the stylus can be at an angle of from 45° to 90° to the line of the series of bits. The width of the indentations should be greater than the width of the reading head to eliminate end distortion by the filled indentations. Usually the indentations will have a length greater than 0.0005 inches, a width as desired, usually 0.05 to 0.50 inches and be spaced 50 to 500 bits per inch. The indentations may have certain selected shapes in cross-section, such as square, triangular, round, etc., to achieve special effects.

This invention has particular utility for the manufacture of machine-readable credit cards, retail merchandise tags, airline documents, identification badges, stock certificates, bank checks, and the like, such as would be used in data processing and information transmission systems.

THE DRAWINGS

FIG. 1 schematically illustrates the process of manufacturing the record;

DISCUSSION

Figures 1, 2:
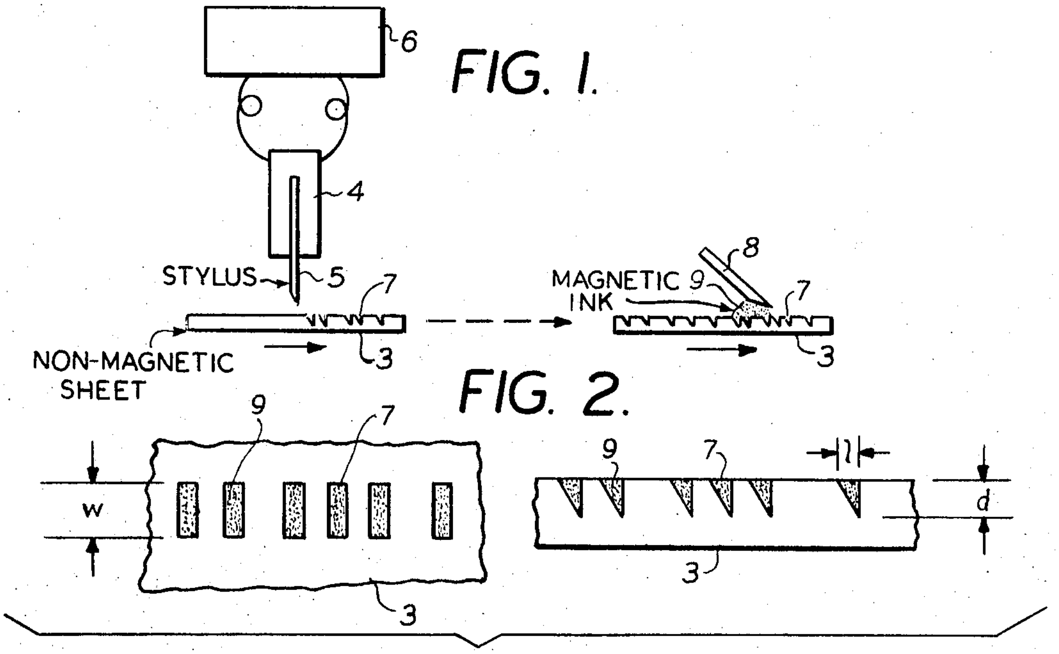
FIG. 2 are top and sectional views of the filled indentations in the record member, greatly enlarged.

Referring to FIGS. 1 and 2, a plastic sheet, card stack, or the like 3, is passed beneath a recording head 4 comprising a solenoid driven stylus 5. The head is connected to a suitable impulse generator 6. The stylus strikes the surface of the record member 3, leaving a line of indentations 7 spaced in an alpha-numeric code form. The presence of an indentation, for example, may represent the binary "1" signal and the absence, the binary "0" signal. The record member can usually be passed under the recording head at a rate of 1 to 50 inches per second.

After being indented, the record member next has a magnetic ink paste 9 squeezed into the indentations, as by a blade 8. The surface of the card may then be wiped, if necessary, and the ink is allowed to cure. Suitable magnetic inks are:

1. Sinclair and Valentine's (Division of Martin Marietta) L. P. Mag. Black B 920456;
2. Lewis Robert's Inc. Magnetic Black F70460;
3. Kohl & Madden's Magnetic Black Q-9471.

As an example, with reference to FIG. 2, the recording density can be 100 bits per inch, the indentations can be triangular in cross-section as shown, having a depth *d* of 5 mils, a width *w* of 100 mils and a length *l* of 2 mils. Member 3 can be a plastic card 20 mils thick.

Figures 3, 4:
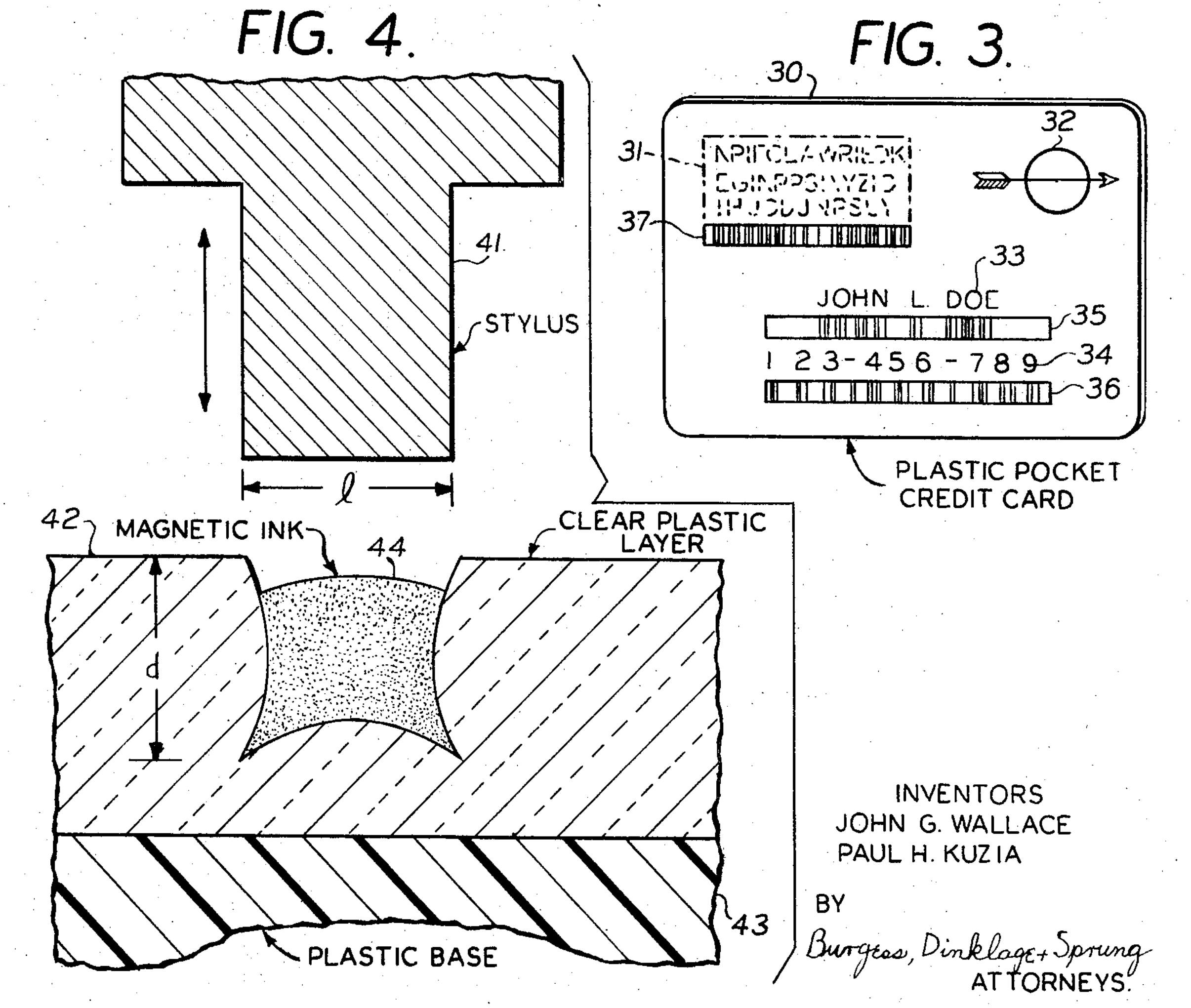
FIG. 3 illustrates one form of record, a pocket credit card.
FIG. 4 is a greatly enlarged cross-sectional view of an alternative and preferred embodiment of this invention.

FIG. 3 illustrates a plastic pocket credit card 30. On its face it may contain conventional man-readable information such as the issuers identity at 31 and its logo at 32. Information that identifies the holder of the card such as his name 33 and his account number 34 are also on the face of the card in visual form. According to this invention, in order to make the card machine readable in a conventional manner as with a permeability, velocity, or flux reading apparatus, the card is imaged with a series of fine indentations 35, 36 and 37 in an alphanumeric binary code, which indentations are filled to approximately the surface of the card with finely divided particles of a magnetically sensible material held in situ by a suitable binder or cement or plastic overcoating. This encoded information can, for example, be used to identify the issuer at 37, and the card holder at 35 and 36. The card can be read by inserting it into a reading device and passing it under suitable reading heads, or by passing the reading heads thereover, the heads being aligned with strips 35, 36 and 37.

If the reader were in a department store and connected to a central computer containing the requisite information, it could be used to verify the account and to print through a printer the customer receipts, inventory control slips and the like, using a suitable encoding keyboard operated by the clerk for the direct entry of information concerning the particular purchase.

This invention is particularly suited to the adapting of the present type of embossed pocket credit cards to be machine readable. The holder of such a card can simply stop at a "conversion station" wherein the code of this invention can almost immediately be placed on a suitable predetermined portion of the surface of the card. It would not be necessary, therefore, for the holder of the card to surrender it for any length of time. This invention can also be used to regenerate business documents having a machine-readable code of one type, such as a punched card, to a document containing the alphanumeric magnetically sensible binary code of the present invention. All that is required is a normal reader adapted to handle the original coded document and a printer as described in conjunction with FIG. 1.

FIG. 4 illustrates another embodiment of the invention. A plastic card comprised of a plastic base layer 43 with a clear plastic top coating 42 is overcoated with a layer of a magnetic ink or paste (not shown) in the area to be indented, and the ink is partially pre-dried, if desired, to some extent. A blunt end stylus 41 is then used to indent the card in the manner previously described and force the ink 44 into the indentation. The depth *d* of the indentation can be about equal to, or slightly greater than, its length *l*, e.g., 54 mils. With the removal of the stylus, the spring-back properties of the plastic cause the walls to bulge inwardly as shown and firmly grip or bind the ink 44 in place, such that it cannot be dislodged, even with bending of the card. Thereafter, the excess ink is removed from the background areas as by wiping with a solvent-dampened rag or wiper.

Having described this invention, what is sought to be protected by Letters Patent is succinctly set forth in the following claims.

We claim:

1. A process of preparing a magnetically sensible record comprising indenting the surface of a non-magnetic receptor sheet with a linear series of indentations of a density of at least 50 bits per inch arranged in a binary code form, filling said indentations with finely divided particles of a magnetically sensible material and thereafter fixing said particles in place, wherein said record is a pocket credit card and wherein said indentations are arranged in an alpha-numeric binary code form with the background of each bit being free of magnetically sensible material and said record also contains on said surface conventional visually readable information.

2. A process of preparing a magnetically sensible record comprising indenting the surface of a non-magnetic receptor sheet with a linear series of indentations of a density of at least 50 bits per inch arranged in a binary code form, filling said indentations with finely divided particles of a magnetically sensible material and thereafter fixing said particles in place, wherein said indentations are made by passing said receptor sheet under a recording head having a striking scribe, and wherein said indentations are filled by sequeegeeing said magnetically sensible material after the indentations have been formed.

3. A process of preparing a magnetically sensible record comprising indenting the surface of a non-magnetic receptor sheet with a linear series of indentations of a density of at least 50 bits per inch arranged in a binary code form, filling said indentations with finely divided particles of a magnetically sensible material and thereafter fixing said particles in place, wherein said indentations are made by passing said receptor sheet under a recording head having a striking scribe, and wherein said sheet is first coated in the area to be indented with said magnetically sensible material and said indentations are filled when formed with said magnetically sensible material by the action of said striking scribe, with excess magnetically sensible material then being removed from the surface of said sheet.

* * * * *